(12) United States Patent
Breen et al.

(10) Patent No.: US 6,615,188 B1
(45) Date of Patent: Sep. 2, 2003

(54) ONLINE TRADE AGGREGATING SYSTEM

(75) Inventors: Peter E. Breen, Basking Ridge, NJ (US); Michael D. Macleod, New York, NY (US); Geoffrey M. Tudisco, New York, NY (US)

(73) Assignee: Freedom Investments, Inc., New York, NY (US)

( * ) Notice: Subject to any disclaimer, the term of this patent is extended or adjusted under 35 U.S.C. 154(b) by 0 days.

(21) Appl. No.: 09/417,901

(22) Filed: Oct. 14, 1999

(51) Int. Cl.[7] .................................................. G06F 17/60

(52) U.S. Cl. ...................................................... 705/37

(58) Field of Search ...................................... 705/25–40

(56) References Cited

U.S. PATENT DOCUMENTS

| | | | |
|---|---|---|---|
| 4,674,044 A | 6/1987 | Kalmus et al. | |
| 4,677,552 A | 6/1987 | Sibley, Jr. | |
| 5,101,353 A | 3/1992 | Lupien et al. | |
| 5,270,922 A | 12/1993 | Higgins | |
| 5,497,317 A | 3/1996 | Hawkins et al. | |
| 5,873,071 A | 2/1999 | Ferstenberg et al. | |
| 5,890,140 A | 3/1999 | Clark et al. | |
| 5,893,079 A | 4/1999 | Cwenar | |
| 5,915,209 A | 6/1999 | Lawrence | |
| 5,918,218 A | 6/1999 | Harris et al. | |
| 5,926,801 A | 7/1999 | Matsubara et al. | |
| 5,946,666 A | * 8/1999 | Nevo et al. | 705/36 |
| 6,014,643 A | 1/2000 | Minton | |

FOREIGN PATENT DOCUMENTS

| | | | |
|---|---|---|---|
| EP | 0401203 | * 5/1990 | ............. G06F/15/24 |
| WO | WO 99/46658 | 9/1999 | |

OTHER PUBLICATIONS

StockPower home webpage (*StockPower—The Power of Investing Direct*), http://www.stockpower.com/ (one page; print date: May 20, 1999)

StockPower information webpage (*StockPower—More Information*), http://www.dsp.stockpower.com/information/moreinfo_content.html (six pages; print date: May 20, 1999).

StockPower FAQ webpage (*StockPower—Homepage Questions Answered*), http://www.stockpower.com/info/hp_faq.html (one page; print date: May 20, 1999).

Allio, Greg, "Long–Term Investors Get Short Shrift On Web", http://www.stockpower.com/indexarticle/overloaded.htm. (two pages; print date: May 20, 1999).

Runkle, George, "*Dripping on the Web*", The Motley Fool Drip Portofio Report, available from http://www.fool.com/ (two pages; publication date: Jan. 11, 1999).

Runkle, George, "*Drips Through the Web*", The Motley Fool Drip Portfolio Report, available from http://www.fool.com/ (two pages; publication date: Mar. 15, 1999).

National Corporate Services, Inc. webpage (*Direct Stock Purchase Plans DPPs and Drips*), http://www.natcorp.com/direct.htm. (four pages; print date: May 20, 1999).

Netstock Direct Corp. press release webpage (*10,000 Transactions Mark Trend in Online Direct Investing*), available at http://www.netstockdirect.com/press/ (one page; publication date: Mar. 5, 1999).

(List continued on next page.)

*Primary Examiner*—Frantzy Poinvil
*Assistant Examiner*—Thach H Bui
(74) *Attorney, Agent, or Firm*—Brown Raysman Millstein Felder & Steiner LLP

(57) ABSTRACT

A trading server collects orders from a plurality of order terminals. Orders are aggregated by transaction type, such as buy or sell types, and by issuer. The combined orders are executed as a single transaction on an exchange.

17 Claims, 4 Drawing Sheets

OTHER PUBLICATIONS

Netstock Direct Corp. website search results on search for "EEO Online DSP/DRiP Companies" executed at http://www.netstockdirect.com/nsdasp/DetailLevel1.asp (one page; print date: May 20, 1999).

Netstock Direct Corp. press release webpage (*Netstock Direct Corporation Teams With The Bank Of New York For Direct Investing Breakthrough*), available at http://www.netstockdirect.com/press/ (two pages; publication date: Feb. 17, 1999).

Netstock Direct Corp. webpage (*What's New at Netstock*), available at http://www.netstockdirect.com/resources/whatsnew.asp (one page; print date: May 20, 1999).

Netstock Direct Corp. webpage (*First Time Here?*), available at http://www.netstockdirect.com/account/youraccount.asp (one page; print date: May 20, 1999).

Netstock Direct Corp. press release webpage (*Netstock Direct Teams With Norwest Shareowner Services $^{SM}$ to Offer Direct Investing Plans*), available at http:www.netstockdirect.com/press/norwestrelease (one page; publication date: Apr. 30, 1999).

DRIP Investor webpage (*DRIP Investor brings you the latest news on Dividend Reinvestment Plans*), http://www.dripinvestor.com/ (one page; print date: Jun. 9, 1999).

DRIP Investor webpage (*DRIP Investor Information Center*), http://www.dripinvestor.com/info.html (one page; print date: Jun. 9, 1999).

Carlson, Charles A., "*Buying Stocks Without A Broker Using Dividend Reinvestment Plans*", http://www.dripinvestor.com/comp1.html (eight pages; print date: Jun. 9, 1999).

Shareholder Communications Corporation (parent corporation to BUY andHOLD.com) survey (two one–page surveys and a return envelope); exact publication date unknown, but prior to Oct. 27, 1998.

* cited by examiner

ONLINE TRADE AGGREGATING SYSTEM

FIELD OF THE INVENTION

The present invention relates to a computer system for effecting securities trades in general and in particular a computer system wherein separate accounts for a plurality of holders are maintained and trades are aggregated over multiple holders prior to being submitted to a trading system or an exchange.

BACKGROUND OF THE INVENTION

In a typical retail securities trading operation, a broker holds the funds and securities of a number of account holders ("holders") and maintains data for each account that tracks the balances for the holder's account and the transactions made by the holder. Examples of such systems can be found at full-service brokerages, discount brokerages and online trading brokerages. These brokerages differ mostly in the manner in which a holder effects a transaction. With a full-service brokerage, a holder might make a trading transaction (a "trade") while on the telephone, and in consultation, with a broker. With a discount brokerage, the holder typically makes his or her own decisions as to trades and calls the discount brokerage with the trade information. With an online brokerage, the holder electronically connects to a computer operated by or for the broker and thus transfers the trade information.

Many existing brokers have several aspects of the above types of brokerage, such that one broker might be a full-service brokerage to some holders or for some trades but be a discount brokerage to other holders or for some trades. However, what is common among each of these brokerages is that they maintain separate accounts for holders. The cash, securities and other instruments owned by a holder at that brokerage are held by the brokerage, often in the name of the brokerage (i.e., "street name") and are represented in the data stored about that holder in account files that are part of the data storage of a computer system operated by or for the brokerage.

Another common feature of existing brokerages is that, when a holder enters an order for a transaction, the transaction is executed by the broker in response to the order, depending on the terms of the order. For example, a holder might submit a buy order, a type of trade wherein the holder receives securities in exchange for cash, and the brokerage would submit a buy order on behalf of the brokerage. After the trade is consummated, the brokerage identifies the cost of the security and debits the holder's cash account accordingly, then updates the holder's balances to show the purchased securities. This process is known as trade execution.

With the increasing availability of online trading, many holders are demanding faster and faster trade execution. Some online brokerages even offer to waive their commission on a trade if the trade cannot be done within 60 seconds. A growing number of day traders, who buy and sell securities by the hour or minute, rarely holding securities overnight, have been requiring even faster transaction speeds, so that they can take advantage of momentary fluctuations in securities prices.

For many investors, such trading systems are unnecessary, as most financial advisors advise nonprofessional investors to enter and exit the market slowly. Also, for small investors with small amounts to invest, the costs associated with each transaction (commission, etc.) make it difficult to invest using such brokerage systems.

In response to the economics of trading and relative transaction costs, many unsophisticated and small investors place their investments in other vehicles, such as Direct Stock Purchase Plans ("DSPPs") or Dividend Reinvestment Plans ("DRIPs"). With a DSPP or DRIP, an investor directly contacts a security issuer (a publicly traded corporation) and makes arrangements with the security issuer to obtain shares in that security issuer, with little or no commission. This benefits the corporation because it results in a wider base of stockholders. In addition, the corporation provides the investor with additional company stock that is purchased with the cash dividends paid by the corporation. Shares are issued either through original issuance or through open market purchases.

Dividend Reinvestment Plans are company sponsored stock plans that enable individuals to purchase shares of stock and/or reinvest dividends in additional shares of company stock for either no fees, or very low fees. The initial purchase of shares must occur through a third party such as a brokerage firm. There are approximately 1,300 DRIP plans available today primarily with Fortune 500 companies.

Direct Stock Purchase Plans are company sponsored stock plans that enable individuals to purchase shares of stock and reinvest dividends in additional company stock, but vary from DRIPs in that DSPPs allow investors to purchase the initial or additional shares directly through the company plan. There are approximately 400 companies that currently offer DSPPs today, primarily large or Fortune 500 companies. A DSPP is often considered a specific form of a DRIP.

First introduced in the mid-1960's, DRIPs did not gain wide spread popularity until the 1980's when corporations recognized them as a cost-effective method to raise capital at lower costs while building closer ties with customers by transforming them into shareholders. Today over 7 million individuals in the United States (representing 40 million accounts) employ DRIPs as part of their long-term investment strategies at over 1,300 companies including many large and Fortune 500 corporations.

DRIPs/DSPPs have several advantages over other investment vehicles, but still have disadvantages. For example, the advantages include:

Reasonable Minimum Investment: Investors can enroll in a DRIP with a smaller initial investment relative to full service, discount and online brokerages. For example, many plans only require the purchase of one to 10 shares or a cash investment as low as $50 to $250. Many online and full service brokerage accounts require an initial deposit of $1,000 to $2,500 or more to open an account. Therefore DRIPs offer an advantage to these high initial deposit requirements.

Investments can be made in dollar amounts (or other currency): Many DRIP plans allow investors to purchase stock in dollar amounts rather than in whole shares, enabling investors to purchase or sell fractional shares and budget for regularly scheduled investments. The only way to currently purchase fractional shares through any brokerage (or broker-dealer) is through their dividend reinvestment service, if they offer one, which only permits investors to have their cash dividends reinvested into additional shares. Some brokerage dividend reinvestment services do not allow purchases of fractional shares.

Reasonable Fees: Although many DRIPs require investors to purchase their initial shares from a brokerage firm to enroll in the plan, after enrolled, investors can purchase shares directly through the DRIP, usually with low or no brokerage commissions. However, these costs are on the rise as corporations are charging more to continue to service their accounts.

Long-Term Perspective: The nature of investing in DRIPs nearly "forces" individuals to purchase and hold stock, thereby adopting a long-term investment perspective through the regular purchase of shares over time to cumulate holdings in the designated corporation offering the plan.

Reinvestment of Dividends: DRIPs are a cost-effective method for investors to put cash dividends to better use by automatically reinvesting in additional shares rather than spending the money or holding it in a bank account. Reinvestment of dividends is also a non-taxable event under U.S. income tax rules with subsequent sale taxed at the corporate going rate while distribution of cost dividends creates a taxable incoming event.

Dollar Cost Averaging: DRIPs provide an excellent dollar-cost averaging investment strategy through regularly scheduled stock purchases over time. Rather than attempting to time purchases based on market conditions, often referred to as "trading". DRIPs allow investors to build wealth and accumulate investments with manageable and consistent stock purchases that can easily be debited from a bank account on a periodic basis. There are no brokerage firms that currently allow investors to set up automatic regular investing schedules to buy stock using a specific dollar amount on a specific time basis.

One disadvantage of the typical DRIP investment plan is that the DRIP enrollment process is slow, antiquated and often forces new investors to endure a six to seven week wait before initial trades are officially executed. Receiving DRIP enrollment and prospectus information through the mail can take up to three weeks and the completion and submittal of the information by investors can take another two weeks. Additional time is spent transferring initially purchased shares, typically through a transfer agent, from the investor's brokerage account into the DRIP program. Finally, another one to two week wait can be expected before receiving a statement confirming the opening of a DRIP account and the assignment of an account number. With the increasing use of the Internet, this step has become easier. Several information providers have Internet sites where an investor can go to providing mailing and other information that the operators of those Internet sites will forward to multiple DRIP companies. While the investor would still have to deal with multiple sets of fees, rules and agreements, at least the investor can get all of that information online and even enroll online. They can even view their account statements online through some of these services.

Yet another disadvantage is that a majority of DRIPs require that investors purchase their initial shares of stock from a broker in order to gain eligibility to enroll in the plan. Initial shares in a DRIP must be registered in the individual investor's name rather than the "street" or brokerage name, an often-confusing point for the first time DRIP investor. Brokers typically charge fees to register stock in the investor's name and produce the stock certificate required as proof of ownership by the DRIPs.

Other disadvantages are:

Multiple Accounts: In the current DRIP environment, investors are required to maintain separate accounts for each DRIP in which they are enrolled, resulting in excessive paperwork and separate trade confirmations and account statements. Furthermore, each plan may have its own unique set of fees and commissions, resulting in a lack of price uniformity among multiple plans.

No Same Day Trades: Same day trades are currently not possible through DRIP plans. An investor cannot use a telephone or Internet-based service to place a buy order on the day they choose. In most plans, there is a specific day(s) per month when shares are purchased on behalf of investors, so investors may have to wait up to two weeks for the execution of DRIP purchases and sales leaving the investor to speculate regarding the actual trading price of the stock.

Cannot Maintain a Cash Balance: A DRIP is a direct ownership of stock. It is essentially a book-entry form of conventional certificate ownership. Therefore, there is nothing in place to provide for a DRIP to offer investors a place to maintain a money market or cash balance in their account. This disadvantage limits investors from making purchases of additional shares on the day or at the time they choose.

No Control over Buying Price: Although DRIP investors are focused on the long term, they naturally strive to achieve the best price. The sluggishness of the DRIP process severely limits the control with which investors can realistically purchase stocks. If, for instance, an investor wanted to purchase a few hundred dollars of a particular stock through a DRIP, they would have to mail in a check to the transfer agent, or plan administrator. The price on the day they mailed the check could be different than the price on the day the check was received and the new shares were purchased.

Cannot Determine Average Purchase Price: DRIP plans do not currently offer a feature to calculate the average purchase price of a stock after years of scheduled dollar cost averaging and dividend reinvestment cycles. Attempting to determine the average purchase price of scheduled trades and dividend reinvestments recorded in paper format can be extremely time consuming and frustrating, if not impossible due to misplaced records. DRIP investors currently have to purchase or use their own software to accomplish this task. This can be difficult, expensive and not necessarily accurate since it would require investors to manually enter their own transaction history into some type of a software program.

Must have a DRIP to Invest Directly: Another disadvantage is that a DRIP investor cannot invest in a DRIP plan in companies that do not offer DRIP plans. There are many companies that are good investment vehicles but do not pay dividends, choosing instead to use profits for research, expansion or acquisitions. Those non-dividend paying companies are not likely to set up DRIPS, so a DRIP investor would have to look elsewhere for investment. The ability to invest in a DRIP-like manner in companies that do not offer dividends and do not offer a DRIP is not available at this time. Yet another disadvantage of DRIPs is that is it difficult to hold those investments in tax-advantaged accounts, such as Individual Retirement Accounts (IRA's).

Mutual funds overcome some of those disadvantages and are readily available to small investors. With a mutual fund, a fund manager maintains an account for each holder and the fund manager pools the funds of the holders. The mutual fund manager makes trades from time to time on behalf of the mutual fund and each holder benefits from a proportionate share of those investments. In nearly all mutual funds, the holders do not have input into the make-up of the mutual fund. If the holder is unsatisfied with the investment strategy of the mutual fund manager, the only choice for the holder is to withdraw the funds and move the funds to another mutual fund with a more agreeable investment strategy. Of course, very large investors could sway the opinion of a mutual fund manager if they owned a large percentage of shares. Mutual funds typically still have sizable barriers to entry for the small investor due to the large minimum investment generally required by most mutual funds. These costs can often exceed $2,000.

A DSPP works essentially the same as a DRIP, except that the initial investment can be handled through the DSPP, whereas a DRIP requires the investor to own usually at least one share of the company's stock prior to enrollment. A DSPP or DRIP can also be set up by a closed-end fund. Such a DSPP/DRIP would work essentially the same way as a DSPP/DRIP of a publicly traded company.

Accounting for trades in securities accounts and mutual fund accounts differ in several respects. For most securities transactions, the transaction is done in a whole number of shares or a whole number of lots, where a lot is 100 shares. For mutual funds, a transaction is typically performed in a dollar amount (or other currency if dollars are not the currency in use). For example, an order for a securities trade might be for 200 shares of the ABC Company and an order for a mutual fund might be for $2,000 of the mutual fund. In both cases, the order has an associated price per share and a number of shares. Because of market fluctuations, the price per share is not often a round number. For the typical securities order, the number of shares is a round number but the total cost of the transaction is not a round number, whereas for the typical mutual fund order, the total cost is a round number but the number of shares is not. Whether some quantity is a round number or not is important for many holders because of the limitations placed on the trades by the brokerage or other operator of the computer system maintaining the holder's account.

SUMMARY OF THE INVENTION

The invention enjoys numerous advantages over prior art DRIP or DSPP programs as well as online discounts and full service brokerages. In one embodiment of a trading server according to the present invention, these advantages include receiving stock orders from investors and combining or aggregating them according to type and issuer. At some later time, typically not in real-time, combined or aggregated trade is submitted to an exchange for execution as a single transaction in the name of the brokerage or broker-dealer and the results of that trade are used to fill the orders so aggregated. The trading server maintains accounts for each of the investors, allowing investors to set up one individual account to trade in many different issues of securities while having orders aggregated with other orders.

In specific embodiments, the transactions are preferably selected from buys and sells, but some embodiments may allow puts and calls as well. The orders, and possibly the trades, might be transmitted electronically over a dedicated data line or telephone line or might be transmitted over the Internet or wireless networks. The aggregated trade might only comprise one order, as might be the case for thinly traded securities, but preferably, many orders can be aggregated into a single trade. To make it more likely that multiple orders will be available for aggregation, the trading server can hold orders until many orders are received by the trading server before transmitting a trade for execution, even if orders are received in real-time.

In some embodiments, trades are submitted during specified times of day, next trading day, or end of the week, independent of when an order is actually received. For example, one embodiment of the trading server might defer execution or transmission of a trade to the exchange, even if orders are outstanding, until a certain time after the exchange opens, to allow the market to stabilize from the initial opening minutes or hour. Such an embodiment might also hold orders received between a cut-off time and the close of market until the next trading day, to avoid any closing instability. Some embodiments might also provide for a cut-off, such as half an hour, between the time a trade is transmitted and the time an order is received, to allow for orderly order aggregation and to allow investors to react more slowly to market movements and new events, as is recommended by many financial advisors but not followed by many investors. Orders can be received either in specified share amounts (such as for a'sale) or in specified dollar (or other currency) amounts (such as for a buy).

The trading server can be one computer or a collection of computers, preferably an arrangement that is connected to the Internet and is scalable to allow many hundreds of thousands or millions of orders to be taken from investors. In one specific trading computer system, a plurality of investor terminals, such as personal computers connected to the Internet and running HTTP browsers, are coupled to a trading server and the trading server is coupled to an electronic trading system to which trades are submitted and subsequently executed. That trading server comprises logic for accepting orders from the plurality of investor terminals, a database for storing accepted orders, logic for accumulating accepted orders in the database, logic for triggering a trading transaction, a means for transmitting a trading transaction to the electronic trading system where the trading transaction represents an accumulation of accepted orders of similar securities and logic for updating an investor account in response to the acceptance of orders and for updating an investor account in response to receipt of a trade confirmation from the electronic trading system.

In one aspect of a trading server, orders are aggregated and/or processed to lower the transaction costs of a trade or trades to accommodate those orders, often at the expense of trading speed, i.e., the orders are filled less expensively, although the order might not be filled as fast as other trading methods. While with long-term investing, such quick turnarounds are less significant than for trading in days or shorter periods, all investors prefer timely execution of orders, which can be achieved with the novel system described herein.

Another aspect of the same embodiments of the invention is that due to the improved efficiency of trading system, either both lower initial investments per order or lower initial amounts to open an account may be achieved while maintaining an economically viable system. Thereby, both the cost per trade, amount of each order or trade, and total amount of the initial account is substantially reduced.

DESCRIPTION OF THE SPECIFIC EMBODIMENTS

In the figures, like elements are labeled with like numbers and different instances of like elements are labeled with like numbers and different parenthetical numbers or letters. Herein, the following terminology is used:

An investor is a person or business entity that opens an account for the purposes of investing in stocks, securities or other financial instruments through the operator of a trading server.

The trading server is a computer system, or collection of computer systems operating together, that accepts orders from investors. The trading server, or an associated computer or apparatus, makes trades on one or more exchanges.

An order is a request or instruction from an investor to change the balances of securities or the cash balance in that investor's account with the operator including, but not limited to, a buy, sell, put or call instruction or order.

A trade is a transaction made by the operator in response to one or more orders. Unlike many electronic trading systems and brokerages, a one-to-one correspondence need not exist between trades and orders. In fact, in a fully operational order and trading system using the trading server, some trades might correspond to hundreds or thousands of orders.

An exchange is an entity, place, network, computer network, communications system or computer system with which the trading server operator can execute trades of securities or an organized market or center for trading securities.

A security is any one of a number of ownership interests including common stock, preferred stock, bonds, notes, bills, options (puts, calls, futures, warrants), mutual fund shares, straddles, or any other type of market traded ownership interests typically issued or traded in units, including shares as an example of units.

An issuer is a company, partnership or other business or personal entity that issues security interests that can be purchased by investors.

Figure 1:
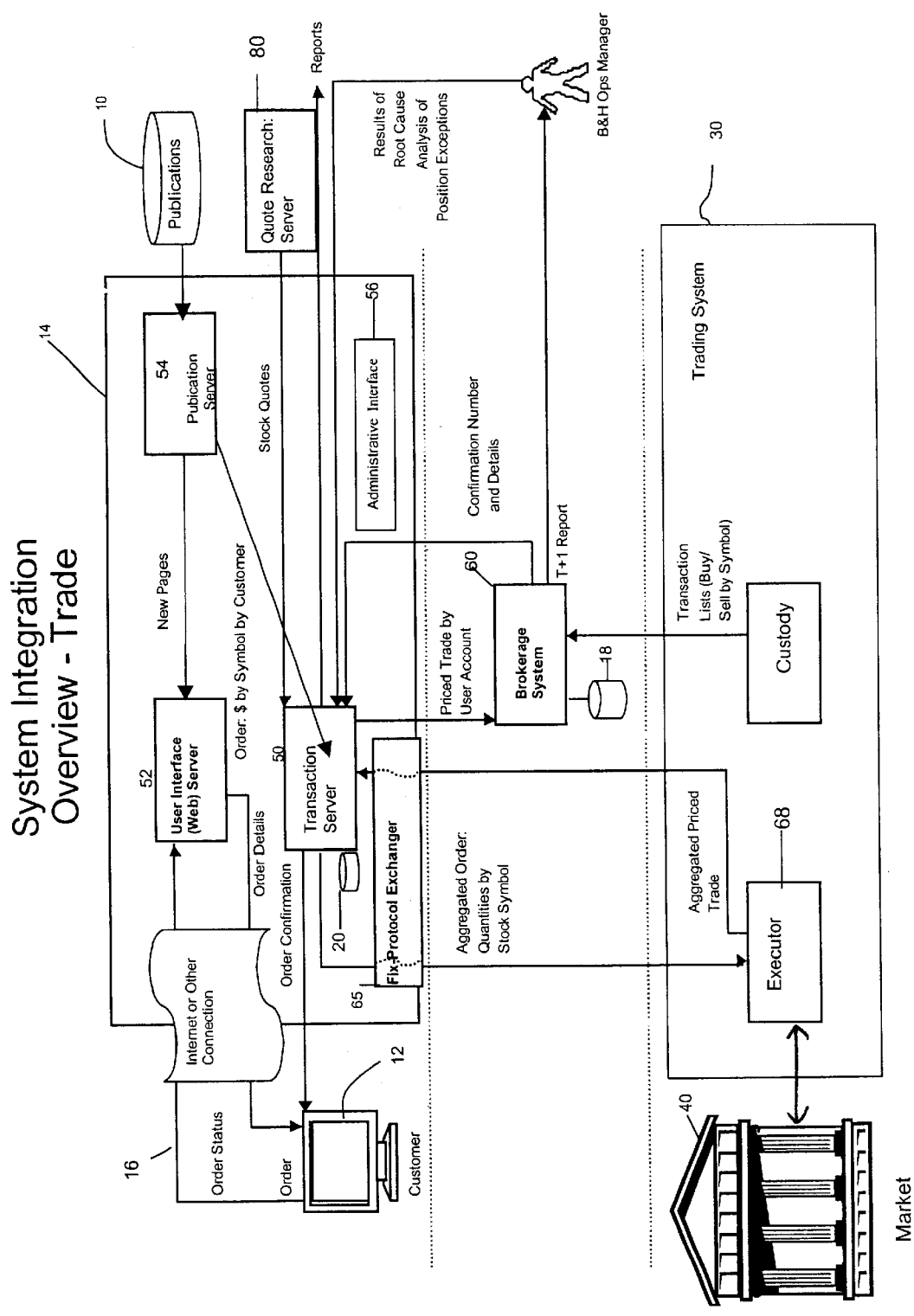
FIG. 1 is a block diagram showing one embodiment of a trading server.

In the basic trading system described in FIG. 1 and ancillary figures, investors place orders at order terminals. An order terminal can be a special purpose computer located at a trading center or trading office, or the order terminal could be software operating on a general-purpose personal computer wherever the personal computer happens to be. The order terminal is coupled, directly or indirectly, to a trading server to allow the investor to send orders, review balances, provide ancillary instructions, get investing information, change investor information stored at the trading server and perform other investment, trading or administrative functions. The order terminal need not be permanently connected to the trading server, but might be connected over an Internet network or connection, LAN, WAN or configured for off-line operation, wherein the order terminal stores activity until a connection or channel to the trading server is available.

The channel can be an Internet connection, a modem connection, a wireless modem connection, or any other suitable connection for communicating between two computer systems, namely the order terminal and the trading server. The software operating the order terminal function on a general purpose personal computer might be a browser that displays HTML (HyperText Markup Language), JavaScript, JAVA™ Server Pages and/or JAVA™ applets communicates with server software running on the trading server using the well-known HyperText Transport Protocol (HTTP) or a variation thereof.

The trading server is expected to interact with many order terminals, even millions of order terminals, often with thousands or hundreds of thousands of connections from order terminals being handled simultaneously. As the trading server receives orders from order terminals, it accumulates them, as described in more detail below. Orders can be received in real-time but, for various reasons indicated below, the trades that correspond to those orders are preferably not executed in real-time or near real-time, to allow for investor analysis and order aggregation.

FIG. 1 is a block diagram of one such trading system 10. As shown there, trading system 10 includes order terminals 12, a trading server 14, connections 16 between order terminals 12 and trading server 14, data storage for investor and operator accounts (account storage 18), data storage for pending orders (order storage 20) and a trade executor 30 for submitting trades for execution by a market 40. Market 40 could be a physical exchange, an electronic clearinghouse or exchange, or other form of matching buy and sell trades for securities, such as an electronic clearing network (ECN). A few examples of markets include NYSE, NASDAQ, Instinet and Island ECN.

Trading server 14 (or an associated server, such as trading system 30) places trades based on the orders, as explained in further detail below. In full operation, there will not usually be a one-to-one correspondence between orders (received from investors) and trades (made on exchanges), as orders are accumulated by security and by trade type (buy, sell, etc.) before a trade is made. Trades other than buys and sells can be allowed (puts, calls, for example), but where the trading server is set up to accommodate smaller investors, those investors will be discouraged from taking speculative investments in puts and calls (option trades). Instead, the trading server will make it easiest for an investor to buy a security and hold that security for an extended time period. Trades might be optimized to reduce the commission on the orders or to spread the commission over more orders. By accumulating orders to form one trade execution instruction, the total cost of trade execution is reduced when the cost is spread over multiple orders. Another advantage to accumulating orders appears when many orders for fixed dollar amounts are placed by investors. Each of those fixed dollar amount orders is likely to be for a fractional number of shares. For example, if an investor places an order for $100 worth of XYZ Company shares that trade in the range of $21–$24/share, the order cannot be filled with an even number of shares. However, by accumulating many such orders into one trade for XYZ Company, the trading server need only make one whole share trade and a fractional share trade (which might be just an internal trade) and the whole share trade split into one even lot trade (a whole number of hundreds of shares) and an odd lot trade (between 1 and 99 shares).

With larger orders, the relative disadvantage of odd lots or fractional shares is reduced. For example, if the trading server receives several buy orders for $20 of a stock that has a market price of $40 per share and more than $4000 worth of $20 orders can be accumulated, at least some of those orders can be filled with an even lot trade. As for fractional shares, an account on the trading server can be maintained for the trading server operator and fractional shares can be transferred to or from the trading server operator (internally "buying" or "selling," as the case may be), so that a trade need not actually be placed with an exchange. Where many orders are accumulated, the effect of holding an open position on a fractional share is a small percentage of the total ordering being done.

An investor can use the trading server as a substitute for a DRIP. In a traditional DRIP plan, an investor sets up an account with each company for which the investor has a DRIP. Then each company handles the DRIP paperwork for its investors. With the trading server in place, companies offering DRIP plans could offload their DRIP administration to the trading server described herein, with the trading server executing trades to get the DRIP shares. Those shares would be distributed to the investors' accounts, while the trading server would decrement the account of the DRIP company to pay for acquisition of the shares, as is done with other accumulated orders. In addition, the trading server would perform those services even for companies that do not have DRIPs.

In some implementations, dividend distribution would be transparent to the dividend issuer. If all the shares in all the trading server accounts were held in the "street name" of the trading server operator, the dividend payments would be directly to the trading server operator. Those payments would be credited to the trading server operator account and from there be distributed to each account that holds the security that resulted in the dividend.

Orders could be accepted for a specified number of shares of a company or a specified dollar (or other currency) amount. In the case where an order is specified in a currency amount, the number of shares purchased will likely be a fractional number of shares. Consequently, the account storage for investors supports an investor holding fractional shares of one or more securities. Where trades must be made in whole shares, an order for a fraction of a share is made on behalf of the operator account so that the aggregated orders sum to a whole number of shares. As explained below, one trade might be broken into two trades, with the first trade being to acquire or divest a set number of shares calculated based on a current share price and a second trade being to account for a difference between the share price at the time of the calculation and the share price upon execution.

The trading server could accept orders for buying securities for more money than the cash balance of the account and require the funds to be available at settlement, but the preferred investment system might require that the cash balance be available at the time an order is placed. If that is the case, the trading server would calculate an estimated cost of the purchase (including any fees due to the trading server operator) and compare that cost to the cash balance, rejecting an order if the cash balance is insufficient. The trading server might be coupled to a banking computer that maintains an account at a bank for the investor, such that the investor has made arrangement for funds to be transferred, as needed, from the bank account to the investor's trading server account. The trading server might also be programmed to automatically transfer funds from the investor's trading server account to the investor's bank account.

On the sell orders, the trading server might be programmed to allow an investor to sell securities not present in the investor's account (selling short) with a plan of offsetting the sell order in the future with a buy order (covering). However, where the trading server operator is offering accounts for the purposes of long-term, conservative equities investing, the trading server will likely be programmed to reject short sales. The trading server would detect attempted short sales by comparing the size of an order for a particular security with the size of the investor's holdings of that security, rejecting the order if the securities are not present in the account and notifying the investor via the order terminal to that effect.

Staying out of the market near market opening and market closing times can further reduce trading volatility and allow for reasoned investor consideration of breaking news, even if orders would otherwise be in a condition for aggregating into a trade. For example, trading server 14 might be programmed with the following rules:

1. Orders received before 10:30 a.m. EST/EDT will be traded in a window from 10:30 a.m. to 11:30 a.m. EST/EDT.

2. Orders received after 10:30 am but before 2:30 p.m. EST/EDT will be traded in a window from 2:30 p.m. to 3:30 p.m. EST/EDT.

3. Orders received after 2:30 p.m. EST/EDT will be traded the next business day in the 10:30 a.m.–11:30 a.m. window.

Those rules allow for the orderly aggregation of orders into trades, giving trading server 14 one full hour or more to process the information and make an orderly trade. Other time for windows and cutoffs can be used, depending on the nature of the markets, hours of operation and other factors. For example, the two windows set out in the above rules avoids a market instability that might exist at the opening bell or near the closing bell. If such instabilities no longer exist, or begin to regularly occur during a window, the windows can be changed. If a window is so narrow, given the volume handled by the trading server, the window could be expanded to allow for the trade volume to spread out more. Of course, if only one order is received for a given security in a given type, or direction (the most common directions are buy or sell), one unaggregated trade might be made to effect that order.

Trading server 14 uses an approach that is exactly counter to the current trend of more instantaneous trades. A trade is not made in response to an order and the investor is not guaranteed that the order will result in securities bought or sold at the bid or ask prices posted at the time of the order. This discourages speculative trading such as day trading. Another advantage to a window that is not near the opening is that the investor then has a reasonable amount of time to research breaking news to make an informed decision about an order. Since the buy or sell price for the security will not be set any differently for a 9:00 a.m. order or a 9:55 a.m. order, the investor can watch the market as it opens before committing to an order.

As shown in FIG. 1, trading server 14 comprises four major modules: a transaction server 50, a user interface server 52, a publication server 54 and an administrative interface 56.

Transaction server 50, in one embodiment comprises an Oracle 8i™ database containing data definition language (DDL) constructs necessary to support the operation of trading server 14. Stored procedures developed in an appropriate data manipulation language (DML) are used to implement the operations of trading server 14 as needed, as well as components, such as Java™ objects, that handle communication with external supporting systems, such as a messaging server used to communicate new or modified information to a brokerage system 60 and a Java™ server used to communicate buy and sell information to a trade executor 68. Trade executor 68 handles all trading, trade execution and trade management services and is operated by the clearing broker. The FIX-protocol exchanger is a JAVA™ server that provides for abstraction of the Financial Information exchange (FIX) protocol used to transmit trade information by the transaction server 50 to the clearing broker. This abstraction allows the transaction server 50 to communicate using any one of a number of distributed system communication protocols such as CORBA, native JAVA™ Remote Method Invocation, etc. and translate the output of these protocols into the FIX protocol required by the clearing broker.

One suitable brokerage system is the SunGard Phase 3™ brokerage system. Transaction server 50 might also include an application server, such as a Java™ application server that instantiates and administers Enterprise Java Beans code used to support site operations. Enterprise Java Beans code provides for abstraction of the database and enhanced scalability. Transaction server 50 is scalable in a number of dimensions. Transaction server 50 has a three-tier architecture in one implementation with the first-tier comprising server software that communicates with the client via HTTP or Secure Sockets Layer (SSL) protocol. This first tier runs on a number of server computers that individually can be scaled to support more load by adding memory and processors and can be scaled in the aggregate by adding more computers. This first tier communicates with an application server (the second tier). The second tier embodies the business logic for the implementation contained in Enterprise Java Beans. This second tier can also be scaled by adding more memory and processors to the individual servers and more servers to the aggregate population. The third tier contains the database server. The database server can be scaled by adding more memory and processors to the server computers and by distributing the database itself, by adding more computers to this third tier as well.

User interface server 52 generates the presentation layer of the site that interacts with the investors making orders and checking their accounts. User interface server 52 could be implemented using Java™ Servlet components. In one embodiment, user interface server 52 contains a flexible architecture that uses templates of pattern files to define the "look and feel" of the presentation layer. The pattern files can be easily manipulated to configure the look and feel of the site as desired. User interface server 52 might operate on top of a Java™ engine that matches information provided by transaction server 50 with the appropriate template and combines these to deliver information to the order terminals (usually a Web browser) in an appropriate form.

The administrative interface 56 is a superset of the functionality of user interface server 52 and, as such, provides similar capabilities with the addition of appropriate administrative tools that allow operations and customer support personnel to administer the trading server and the business of operating the trading server.

Publication server 54 is typically a Java™ server-based application that provides publishing services for the other components of trading server 14. Using publication server 54, third-party content providers can send original content for publication to the site. Additionally, authorized personnel can also create content for the site. Preferably, publication server 54 uses a template-based publishing process to publish the received information in web pages for the site containing the new content and the "look and feel" embodied in the template. Publication server 54 also might use a workflow process to manage the creation, approval, and distribution of the content.

A quote/research server 80 provides stock quotes, company research, company profiles, business news and a whole host of other financial information including real-time quotes used for getting share amounts.

Brokerage system 60 generates a T+1 report that shows a comparison of the number of shares either purchased or sold as reported by trading system 30 with the number of shares as reported by brokerage system 60.

User Interface Server 52 might use JAVA™ servlets to format user account information based on templates to enable the user experience. Publication server 54 might be a JAVA™-based server that publishes static content and the templates for the user interface server on a regular and as needed basis.

Figure 2:
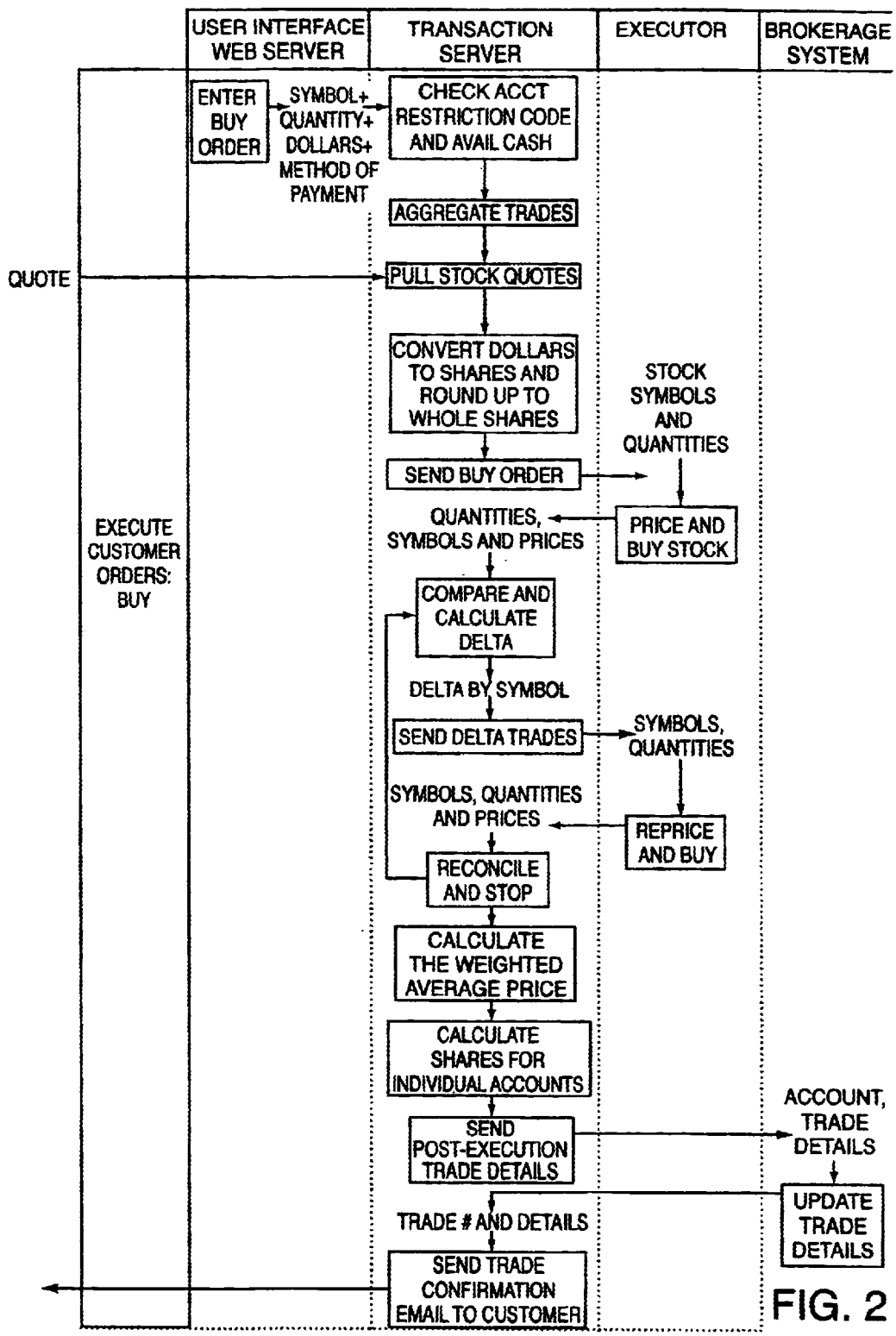
FIG. 2 is a flowchart of one process executed by a trading server to effect a buy trade.

FIG. 2 is a flowchart of one process executed by a trading server to effect a buy trade. That flowchart describes the workflow for executing a BUY order by a customer. Each customer places an order (usually in dollars) to buy a particular stock. That order is aggregated with other customer orders to yield a total dollar amount that must be bought for a particular stock. Transaction Server 50 does the aggregation and then gets a real-time stock quote from quote and research server 80. This quote is then used to calculate the number of shares that must be purchased to fully invest customer monies. A BUY order for this number of securities is sent to FIX-protocol exchanger 65, which translates the BUY order into the Financial Information eXchange protocol needed by executor 68. Exchanger 65 sends the order to trade executor 68, which then executes the order on market 40 and completes the transaction and sends back a FIX message with the execution details to exchanger 65. Exchanger 65 translates this message and sends the details to transaction server 50. If the actual execution price on the stock exchange is different than the quote obtained at the time the order was placed, transaction server 50 reprices and buys again until fully invested. Once fully invested, transaction server 50 allocates the shares purchased by the customers to their accounts and sends the trade details to the books and records system that is part of the middle office. When the middle office updates its information, transaction server 50 sends a trade confirmation email to the customer.

Figure 3:
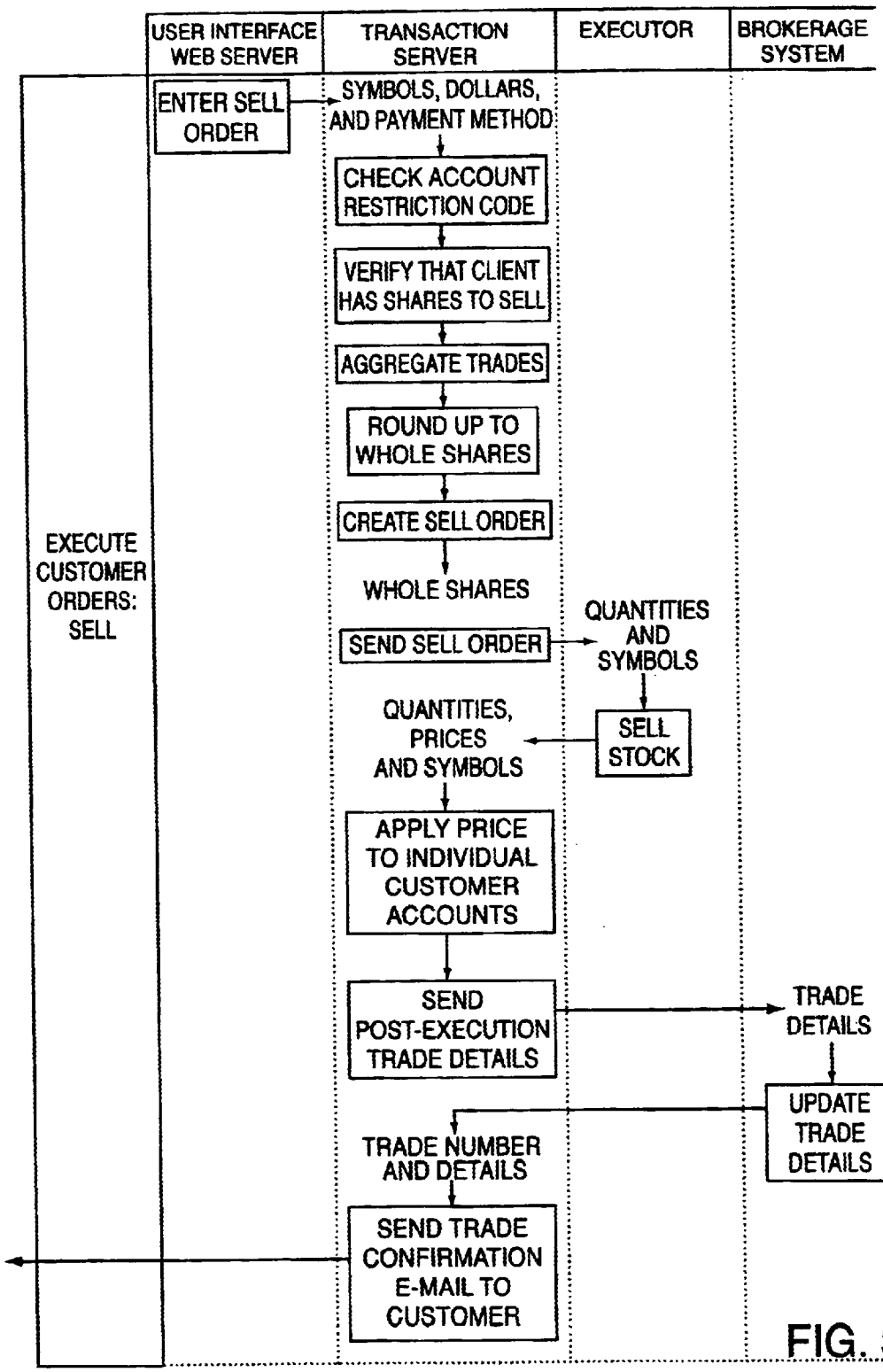
FIG. 3 is a flowchart of one process executed by a trading server to effect a sell trade.
Figure 4:
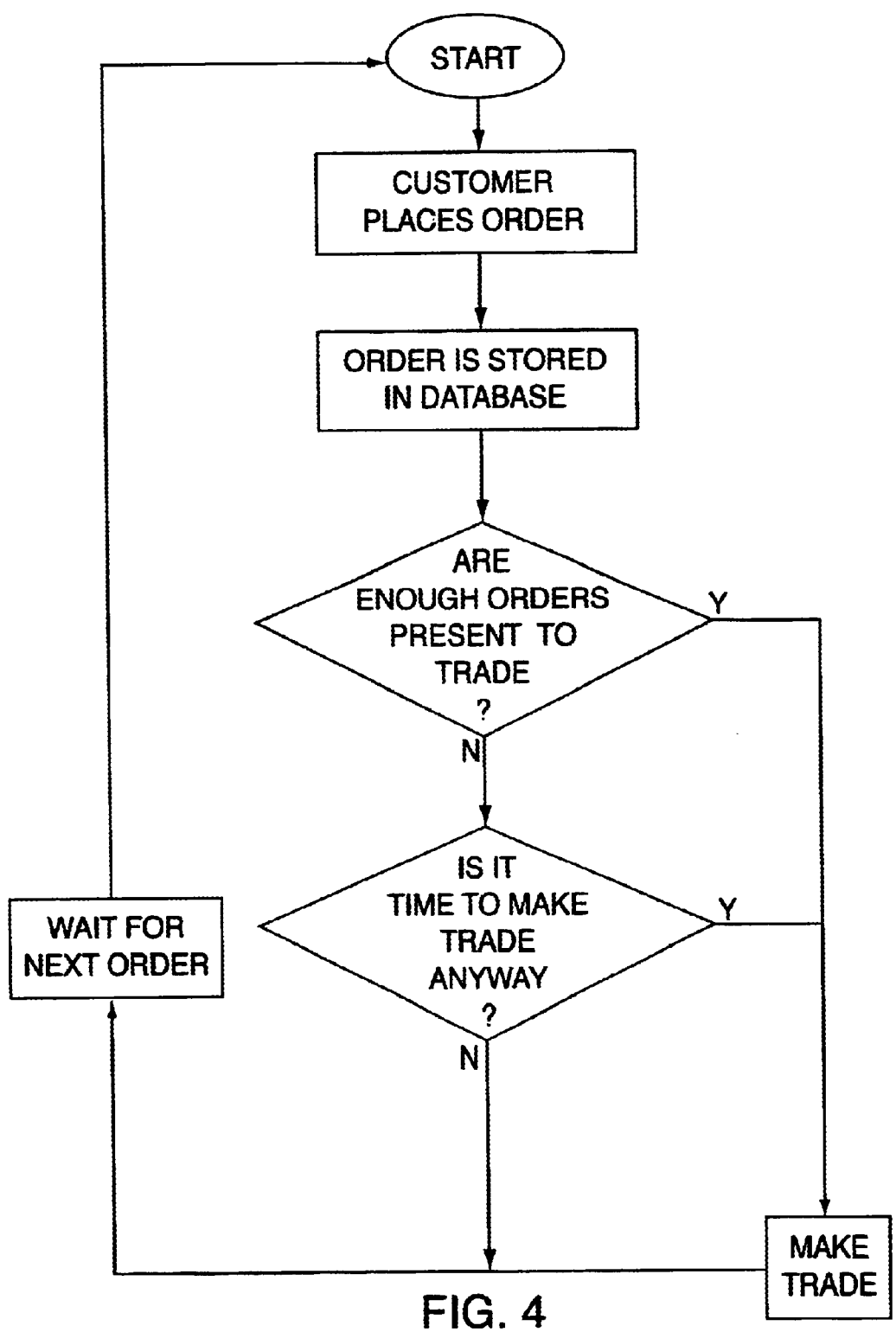
FIG. 4 is a flowchart of one process for accepting orders and transmitting trades for execution.

FIG. 3 is a flowchart of one process executed by a trading server to effect a sell trade. For a SELL order, the process is slightly different. A customer places an order to sell a certain number of shares of a particular stock. Transaction server 50 aggregates all of the sell orders of each customer and rounds up the entire sell order to the nearest whole share. While sell orders typically submitted by a customer are for a specified, whole number of shares, nothing requires that the sell orders be for a specified, whole number of shares. In fact, where the customer enters an order to sell all of his or her holdings of a particular security, the number of shares being sold will often include fractional shares. After the trade has been made, transaction server 50 might add in any additional shares from the facilitation account to cover the fractional shares sold, or the case may be that the facilitation account might have a temporary short position. In a case where there is a short position, transaction server 50 will cover the position with a match from the next aggregate buy order or it can make a trade on the open market for one whole share, thus leaving a long position of a fractional share in the facilitation account. While covering fractional short positions is not required, it is often easier on bookkeeping processes if the facilitation account only contains long positions.

In some cases, transaction server 50 might effect an additional trade to pick up or sell shares as needed if the transaction price/share was different than the quote. For example, transaction server 50 might get a quote for ABC at $50 per share and purchase two shares to accommodate a combined stock order to buy $100 of ABC stock. If the market price changes between the time of the quote and the time of execution (typically a matter of minutes, seconds or less, but finite and nonzero in any case), then the two shares would cost more or less than $100. For example, if the executed price was $45 per share, only $90 of ABC stock would have been acquired and transaction server 50 would generate a transaction for an additional $10 of ABC stock. Of course, since that $10 would represent a fractional share of ten 45ths in this example, one share would be acquired and the balance, thirty-five 45ths of a share assuming the price did not change again, would be purchased for the facilitation account.

The SELL orders are placed by transaction server 50 through the FIX-protocol exchanger 65 to executor 68. The order results are passed back. The price obtained for the shares sold is distributed to the customer accounts and the trade details are transmitted to the middle office. Transaction server 50 then sends the customer a trade confirmation via email to confirm the sale of specified shares and the share price together with the net amount realized from the sale. The customer can be provided with cost bases in an integrated fashion and chart results, allowing the customer to compare DRIP companies (as well as non-DRIP companies).

Cost basis for purchases is useful for investors that purchase stock on a regular basis, as each purchase is likely to have a different share price. Cost basis for securities can be provided online so that an investor can easily check cost basis.

In other variations of the basic trading server, a trading server might also accept trades from other entities, in effect acting as a clearinghouse for other trades. The trading server might also be combined with an exchange so that the trading server also handles the trades themselves. As described above, the basic trading server aggregates orders of a particular type (e.g., common stock of the XYZ Company) and of a particular side (buy, sell). However, the trading server could aggregate orders of a particular type and of either direction, so that only a net trade need be made. If a net trade were made, the trading server operator would not end up paying the spread for the orders made in the direction opposite the net trade. For example, if the trading server received orders to sell $100 worth of XYZ company common stock (orders can also be in shares, but will probably be in dollars or other currency) and orders to buy $80 worth of XYZ company common stock, the trading server would aggregate those orders into a net trade to buy $20 of the stock, saving the spread on the $80 of buy and sell orders that are handled internally. These spread savings can be shared among the investors and the trading server operator.

In some cases, an investor might want to place several trades at the same time. Unlike a conventional trading system, where each order is placed as it is made, with the trading server described herein, multiple orders can be collected at once, since the trades are purposely not executed in real-time. Thus, an investor could browse the trading Web site, select a security and enter a dollar amount after researching the security, then select another security, perform research and enter a dollar amount, and so on. The securities can be collected in a "shopping cart" type database and held for a final checkout by the investor. This allows the investor to adjust the amounts for each order before placing a multiple-security order. For example, the investor might begin a session with a set dollar amount in mind to invest during that session. After placing selections into the shopping cart database for that session, the trading Web site might present a page showing a total for the pending orders for specific securities and allow the investor to modify either the "cart" of securities, the total value of the order or the percentages of a fixed order value that are allocated to each of a "cart" of securities. Once the session is complete and the investor approves of the cart of securities, a multiple-security order is placed at the trading server and each individual security order in the cart is processed as described above for single-security orders. With a conventional trading system, customer approval of each security order (price, quantity, etc.) is needed.

Since the pricing of a security is likely to change over the time a typical investor spends ordering multiple securities, the conventional trading system must present the current price and quickly commit the investor to the order so that a corresponding trade can be made. By contrast, with the trading system described herein, trades are accumulated for each order, so the prices for each order do not need to be presented and do not need to be determined shortly after an order is placed, thus making cart shopping for multiple securities feasible.

In the preferred embodiment, an investor is always protected on the actual dollar amount that they intended for investment with the trading system described herein. This is unlike a conventional trading system that allows market orders whereby an investor determines the amount of shares to purchase, but not the price at which to execute the trade. In a stock or market with high volatility, the dollar amount the investor intended to spend could far exceed their original intentions.

In the system shown in FIG. 1, the trading server submits trades at prespecified times of day. If after-hours trading becomes significant, those times of day described above can be modified to accommodate after-hours trading (e.g., having an additional trading window from 5 p.m. to 6 p.m. EST). In one variation, trades might be held (with customer agreement) until a predetermined quantity of orders is received, especially if such holding reduces the overall transaction costs associated with placing trades for the held orders and the saving is passed on to the customer. For example, if the trading server operator is charged a fixed fee per day for trading a given security, the trading server might aggregate trades over one or more days to reduce the commission per order.

Information related to the account application process, such as demographic information, financial information, employment information and information related to all pending orders can be stored by trading server 14. Executed trade details and histories can also be replicated at trading server 14 and at brokerage system 60. With trading server 14, an investor can buy a set dollar (or other denomination) amount of a security, sell a number of shares of a security, sell all shares of a security, perform one of the above transactions on the 1st and the 15th of each month (or other regularly scheduled times), or perform similar transactions.

For the customer to be able to make a trade, the account must have sufficient money available to buy shares of stock, the customer must have previously standing instructions for an ACH link to an outside bank account, or the customer must have a regularly scheduled ACH withdrawal set up to purchase shares of a particular stock(s) on a particular day. In order to sell shares, a customer's account must be in good standing in compliance with the operator's policies.

Although particular forms of trading systems appear in the figures, those skilled in the art will recognize that any of a number of variations of a trading system could be used to implement the methods of the various embodiments of the present invention. For example, the trading server of FIG. 1 could be implemented as a distributed system for robustness and disaster recovery. In a variation of the systems described above, the order terminals might be supplanted in part by a telephone ordering system where an investor places an order by telephone, either using the keys of the telephone to enter the order into an automated system or by speaking to an automated voice response system (IVR) of talking to a human operator.

While the above is a complete description of specific embodiments of the invention, additional embodiments are also possible. Therefore, the above description should not be taken as limiting the scope of the invention, which is defined by the appended claims.

What is claimed is:

1. A method of receiving and executing security orders from one or more investors comprising the steps of:
   a) receiving a plurality of security buy orders for differing issuers from the one or more investors over the Internet wherein the plurality of security buy orders are specified in units of currency;
   b) executing a purchase through an exchange to cover the plurality of security buy orders; and
   c) allocating shares obtained in the step of executing a purchase in fractional shares to investors when the number of shares corresponding to their security buy orders are not whole numbers of shares.

2. The method of claim 1, further comprising the steps of:
   d) receiving sell orders;
   e) executing a sell through an exchange to effect received sell orders; and
   f) allocating funds obtained in the step of executing a sell to investors associated with the sell orders.

3. The method of claim 2, wherein each sell order specifies a whole share amount.

4. The method of claim 1, wherein the step of executing is a step of executing the purchase on a predetermined day or at a predetermined time relative to when the receiving step occurs.

5. The method of claim 1, wherein the purchase quantities are specified as whole dollar amounts.

6. The method of claim 1, wherein the step of receiving is a step of receiving in real-time.

7. The method of claim 1, further comprising the steps of:
   d) receiving a plurality of sell security orders for differing issuers from the one or more investors over the Internet;
   e) executing a single sale through an exchange to effect the plurality of sell orders; and
   f) allocating funds obtained in the step of executing a single sale to investors corresponding to the plurality of sell security orders.

8. A method of receiving and executing security orders from one or more investors comprising the steps of:
   a) receiving a plurality of security orders from the one or more investors over the Internet wherein the type of security orders includes at least a plurality of buy orders for the same security wherein the plurality of buy orders are specified by the one or more investors in dollar amounts and include an order to purchase at least a fractional share of the security;
   b) combining the plurality of security orders by same type and same issuer into one or more combined security orders; and
   c) executing the one or more combined security orders as a single trade or transaction per combined security order through the exchange.

9. The method of claim 8, wherein:
   d) the step of receiving is a step of receiving the plurality of security orders in real-time for the purchase or sale of common or preferred stock through an exchange; and
   e) the step of executing is performed at a predetermined time not in real-time relative to when the step of receiving occurs.

10. The method of claim 8, wherein the step of combining includes combining of the plurality of fractional buy orders of the same type of security and the same issuer into combined buy orders.

11. The method of claim 8, wherein the step of combining further comprises a step of combining a buy order from a clearing account such that each combined security order results in an order for a whole number of shares.

12. The method of claim 8, further comprising the steps of:
   d) receiving a plurality of sell orders from the one or more investors;
   e) combining the plurality of sell orders by same type and same issuer into one or more combined sell orders; and
   f) executing the one or more combined sell orders as a single trade or transaction per combined sell order through the exchange.

13. The method of claim 8, wherein the steps of receiving and executing security orders allows a reduced cost to each individual investor by sharing at least a portion of the cost of the combined security orders among the plurality of investors through the combination of buy orders or sell orders of the same type and same issuer.

14. The method of claim 8, wherein the plurality of buy orders are received in real-time and are for the purchase of common stock.

15. The method of claim 8, wherein the receiving, combining, and executing steps are repeated for all buy orders received in the receiving step and combined buy orders are executed for each issuer.

16. A method of receiving and executing sell orders from one or more investors comprising the steps of:
   a) receiving a plurality of sell orders for differing issuers from the one or more investors over the Internet, wherein the sell orders each include a sell quantity that is specified in whole shares, fractional shares, or whole and fractional shares;
   b) aggregating the plurality of sell order by issue to determine an aggregate sell amount for each issuer;
   c) for each issuer for which the aggregate sell amount is not a whole number of shares, adding a rounding sell order for that issuer to the plurality of sell orders to round the aggregate sell amount for that issuer to a whole number of shares, thereby forming a combined sell order for each issuer with the number of shares in the combined sell order being a whole number;
   d) executing each combined sell order on an exchange; and
   e) allocating funds obtained in the step of executing to each of the one or more investors according to the sell quantities specified in their sell orders and a share price obtained in the step of executing.

17. The method of claim 16, further comprising a step of allocating funds obtained in the step of executing to a clearing account according to the sell quantity of the rounding sell order if a rounding sell order was used to round a combined sell order.

* * * * *

UNITED STATES PATENT AND TRADEMARK OFFICE
CERTIFICATE OF CORRECTION

PATENT NO.     : 6,615,188 B1                                                           Page 1 of 1
DATED          : September 2, 2003
INVENTOR(S)    : Breen et al.

It is certified that error appears in the above-identified patent and that said Letters Patent is hereby corrected as shown below:

<u>Column 16,</u>
Line 42, delete "order by issue" and insert -- orders by issuer -- in its place Signed and Sealed this Fourteenth Day of October, 2003

JAMES E. ROGAN
*Director of the United States Patent and Trademark Office*